United States Patent

[11] 3,581,593

[72] Inventor Donovan L. Robinson
Indianapolis, Ind.
[21] Appl. No. 855,976
[22] Filed Sept. 8, 1969
[45] Patented June 1, 1971
[73] Assignee General Motors Corporation
Detroit, Mich.

[54] GEAR VIBRATION ARRESTOR
12 Claims, 4 Drawing Figs.

[52] U.S. Cl. .................................................. 74/443
[51] Int. Cl. ................................................. F16h 55/14
[50] Field of Search ........................................... 74/443,
432, 421

[56] References Cited
UNITED STATES PATENTS
3,326,059 6/1967 Gordon ........................ 74/443

*Primary Examiner*—Leonard H. Gerin
*Attorneys*—W. E. Finken and A. M. Heiter

ABSTRACT: A sound reduction or aborting device for a gear web having a conical annular spring having its outer perimeter continuously engaging in frictional contact with the side face of the web at the circle of anodic areas at or adjacent the pitch circle and a fastening pivotally contacting the central portion or inner perimeter of the annular conical spring providing a preselected preloading and a universal pivoting action so that deflection forces moving the spring in one direction at any point on the outer perimeter cause an opposite movement at the diametrically opposite point on the perimeter causing a distribution, dissipation and interference of vibrations for a reduction in deflection and to prevent resonance causing excessive sound.

PATENTED JUN 1 1971

3,581,593

INVENTOR.
Donovan L. Robinson
BY
a. M. Weiter
ATTORNEY

GEAR VIBRATION ARRESTOR

This invention relates to a vibration and sound arrestor or aborter particularly for gear webs.

The gearing in transmissions often presents a noise control problem. During the operation of gearing, the gear impulses which are the result of tooth engagement forces at the area of initial contact of each pair of teeth generate an engagement pulse or gear impulse. These gear impulses occur at a base frequency proportional to the number of teeth and the speed of the gear and the harmonics of the base frequency and induce vibration of the gear web. Many prior efforts to solve the gear noise problem through gear tooth design, gear preloading, gear damping and torsional vibration dampers in the drive train have proved partially successful These approaches do not attack the problem at the main point or source of the noise, the gear web at the anodic area adjacent the pitch circle of the gear teeth and do not use the force available due to the vibration of the gear web to abort and attenuate the vibration.

The gear web acts as a drum head causing excessive sound as a result of the vibration caused by the gear impulses. In accordance with this invention it is proposed to reduce or abort the sound emanating from the gear web by preloading an annular member into continuously annular engagement with the side face of the web at the circle of anodic areas at or adjacent the pitch circle and mounting this member with a preload to increase the resonant frequency above the natural gear impulse frequency in the normal operating range or above the audible frequencies and for universal pivotal movement of the member so that a vibration force at any one anodic area is transferred in an opposite direction to the member at an infinite number of points about the circumference causing a distribution, dissipation and interference of vibrations to prevent resonance and to reduce the deflection of the vibrations and thus the noise level.

An object of this invention is to provide a sound reduction and aborting device for engaging the side face of the web portion of a member subject to vibration inducing impulse forces at the outer perimeter consisting of an annular member continuously and frictionally engaging the side face substantially at the circle of anodic areas just within the zone of impact and a fastener holding the member against the side face of the web providing a preselected preloading and so that deflection forces moving the spring in one direction at one point on the outer perimeter cause an opposite movement at the diametrically opposite larger area on the outer perimeter causing a distribution, dissipation and interference of vibration for sound reduction.

Another object of the invention is to provide an improved sound reduction and aborting device which engage the side face of the web of a member subject to force impulses generating a vibration to transfer a force causing an interfering vibration for sound reduction.

Another object of the invention is to provide an improved sound reduction and aborting device preloaded into engagement with a gear to change the natural resonant frequency to a value outside of the operating range of the gear.

Another object of the invention is to provide an improved sound reduction and aborting device to change the natural resonant frequency to a value above the audible range by the application of an axial preload on the gear web.

These and other objects of the invention will be more apparent from the following description and drawing of the preferred embodiment of the invention.

Figure 1:
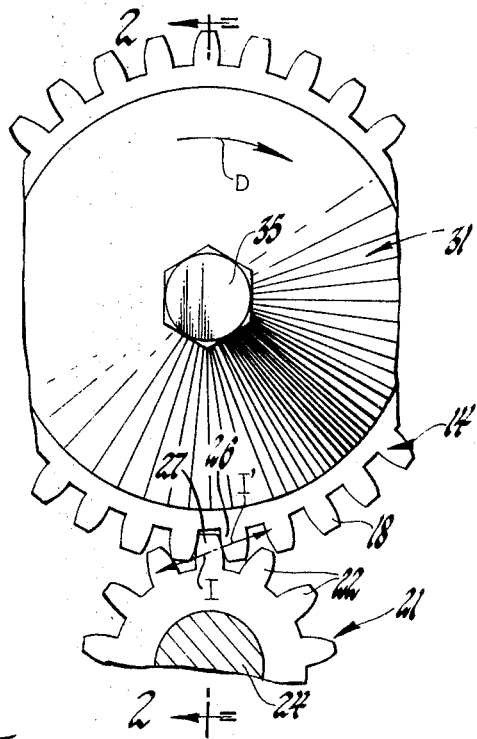
FIG. 1 is a view partially in section illustrating the invention.
Figure 2:
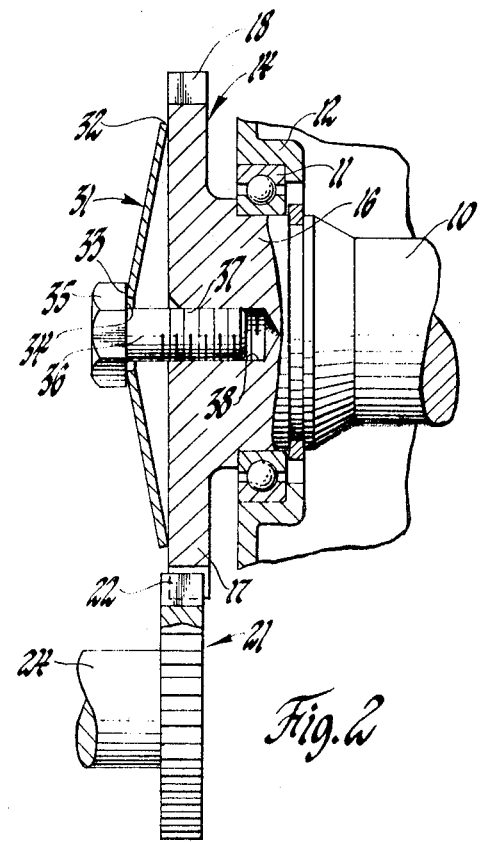
FIG. 2 is a view partially in section taken from the line 2-2 of FIG. 1.

The invention is illustrated in FIGS. 1 and 2 in a drive train having an input shaft 10 rotatably mounted in a bearing 11 supported in the housing 12 and having integrally formed or attached thereto an input gear 14 having a hub portion 16, a web portion 17 and gear teeth 18. The input gear 14 drives an output gear 21 having teeth 22 for transmitting the drive to the output shaft 24.

The gear or gears with a large web portion, in this case gear 14, is under normal conditions the source of most of the sound in a gear train. Thus the sound reducing and aborting device is applied to the large gear having a web and generally not to the small gear or pinion which does not have a significant web structure. Where both gears have a significant web, this device is preferably applied to both gears.

In FIG. 1 with the gears rotating in the direction of rotation indicated by the arrow D, the line of action is at the gear pressure angle to the common tangent to the pitch circles of both the gear and the pinion. The gear contact in spur gearing is linear and at points along the line of action. In FIG. 1 the tooth 26 of gear 14 is illustrated at the point of initial contact with the tooth 27 of pinion 21 and vector I along the line of action represents the force impulse transmitted from the gear 14 to the pinion 21 while the vector I' represents the force impulse from the pinion to the gear or the reaction.

The sound aborting device consists of a stiff belleville or annular conical spring 31 having an outer perimeter 32 in preloaded frictional engagement or contact with the side face of the gear web at the circle of anodic areas which is closely adjacent the pitch circle. The inner perimeter 33 of the annular spring engages the under surface 34 of the head 35 of bolt 36 which has the threaded portion 37 secured in threaded hole 38 to hold the spring under the proper preload and to universally pivotally mount the spring so the primary vibration force at any point on the anodic ring is transmitted to the perimeter of the spring and by the spring acting as a centrally pivoted lever diametrically across the spring to an opposite and slightly larger area at the anodic ring to induce a secondary reduced vibration so the primary and secondary vibrations meet at about equal strength and out of phase to obtain a high degree of self cancellation and diffusion to avoid objectionable noise.

Figure 3:
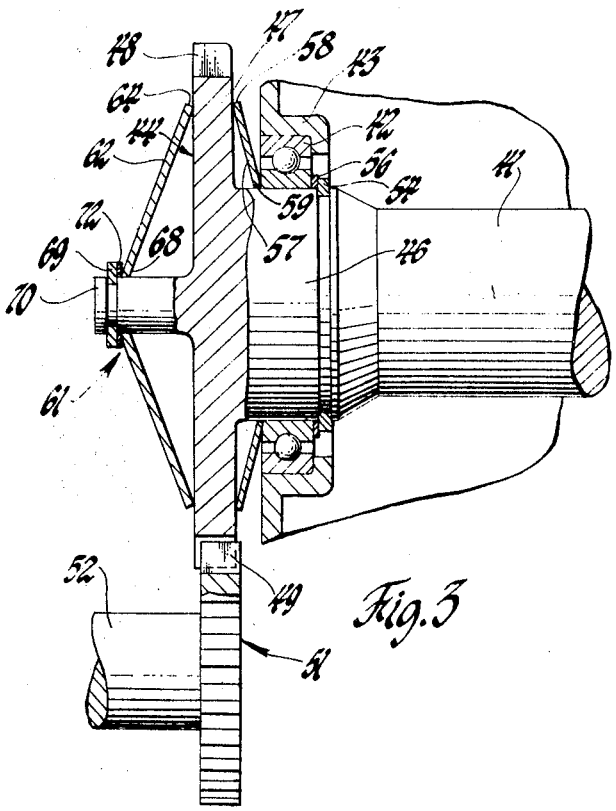
FIG. 3 shows a modified form of the invention.

The modified form of the invention illustrated in FIG. 3 has a drive train consisting of an input shaft 41 rotatably mounted by a bearing 42 fixed in a housing 43 and driving the input gear 44 having a hub portion 46, a web portion 47 and teeth 48 which mesh with the teeth 49 of the output gear 51 driving the output shaft 52. The vibration aborting device may consist of the spring 57 which has the outer perimeter 58 thereof in frictional contact with the surface of the web 47 of gear 44 at the circle of anodic areas and has the large inner perimeter 59 engaging the bearing 42. The shaft 41 is then pushed to the right to preload spring 57 and the snapring 54 inserted to hold the shaft 41 gear 44 in the proper position with the spring 57 precompressed to the proper degree between the gear and bearing. In order to provide the proper degree of precompression force on the spring 57, the precompression on spring 57 may be adjusted by employing a shim 56 between the bearing 42 and snapring 54. The shim 56 may be a shim of variable thickness or a plurality of shims to provide a total adjustable shim thickness. The spring 57 which has a very large inner diameter, and a shorter differential diameter than the spring shown in FIG. 2, nevertheless, is universally pivotally mounted at the inner perimeter where it contacts the bearing 42. Thus deflection forces moving the spring in one direction at any point on the outer perimeter of the spring cause an opposite movement at the diametrically opposite point or area on the outer perimeter causing a similar distribution and dissipation of the vibration. Since these forces are transferred through a more semicircular path this dissipating effect is enhanced.

FIG. 3 also shows a modified vibration arrestor 61 on the end face of the gear 44 which may be used alone or for maximum silencing in combination with arrestor 61. This modified arrestor 61 has an annular conical spring 62 having an outer perimeter 64 in frictional contact with the end face of the gear web at the anodic area circle near the pitch diameter. The inner perimeter 68 engages a snapring 69 fixed in a groove in the integral stud 70 formed on the gear. A shim 72 may be used if needed between the snapring and spring to provide an adjustable locked support to hold the spring at a predetermined preload.

Figure 4:
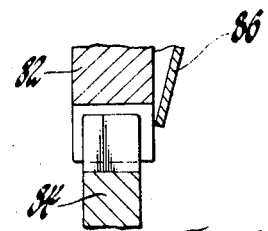
FIG. 4 shows another modification.

If the circle of anodic areas is between the addendum of the mating gear and the pitch circle or at the pitch circle the gear 82, FIG. 4, is made wider than pinion 84 so the conical spring 86, which is like, and mounted like, one of the above springs 31, 57 or 62, contacts the face of gear 82 without interference with gear 84.

During the operation of gearing the successive initial contact or engagement of each of the consecutively engaging pair of teeth for transmitting torque cause on initial contact an engagement pulse or gear impulse. These gear impulses occur at a base frequency proportional to the number of teeth and the speed of the gear and harmonics of the base frequency. The gear impulses are generated by the engaging forces between the engaging teeth for transmitting torque. These forces are theoretically represented by a force vector I or reaction vector I' tangent to the pitch circle at the initial contact point. Due to normal variations in gearing form the direction and value of the force vector varies. During the first or initial part of the engagement of each pair of teeth, when the force quickly increases, the gear tooth is accelerated and deflected and there is an impact engagement at the linear area of contact causing waves of deflections to flow through the gear web. When the frequency of these deflections or a low harmonic thereof is substantially equal to the natural or resonant frequency of the gear web resonance will be induced and the sound level will be excessive.

Such excessive sound at a resonant frequency may be reduced or aborted by mounting a conical and preferably annular spring such as a belleville spring on the side face of the gear web with the outer perimeter continuously engaging in frictional contact the side face of the web at the circle of anodic areas which is concentric with and at or within the pitch circle and generally within the root circle of the teeth. The anodic or antinodal area has the maximum amplitude of deflection due to vibration induced by gear impulses. The fastening device universally pivotally contacts a central portion of the conical spring, preferably at the inner diameter of an annular conical spring providing a preselected preloading so that deflection forces moving the spring in one direction at any point or area on the outer perimeter of the spring cause an opposite movement at the diametrically opposite larger area on the perimeter causing a distribution, dissipation and interference of vibrations to reduce deflection and prevent resonance. The spring has sufficient stiffness to transmit a major portion of the vibration deflection forces diametrically across the spring which as shown in FIG. 1 will be the point on the gear most remote from the source of vibration and has sufficient give or resiliency so the form of the vibration, the frequency and amplitude, is not repeated or reproduced but is changed, diminished and distributed, in a manner to cause interference with the original gear impulse vibrations. The secondarily spring induced vibrations have an out of phase relation to the gear tooth vibrations causing self destruction of both vibrations.

Since the secondarily induced vibrations are over a larger area, further induced vibrations are carried substantially diametrically in the same way to continue the same effect around the complete perimeter to dissipate the vibrations.

The frictional contact of the outer perimeter provides hysteresis which reduces deflections. The preload on the spring increases the resonant frequency and thus the preload selected is preferably at higher values to increase the resonant frequency above the gear impulse frequency in the operating speed range or above the audible frequencies. Thus a signal frequency high intensity vibration which produces a high level of objectionable sound is changed to a low level broad band random vibration with a low level of nonobjectionable sound.

The spring provides a vehicle for energy to travel from a point on a gear web, which is vibrating at its own natural frequency, to an opposite area and then to any other point on the gear web. The vehicle must have a natural frequency considerably different from the gear web so vibrations, upon reentry to the gear web at the opposite area, exert forces counter to free body vibrations emanating from gear tooth mesh. Since the spring is thinner, has less mass, is made of hard spring steel and under higher axial stress than the gear web which is normally thicker, has a greater mass, is made of softer steel and is under lower axial stress, they have a very different natural frequency.

It will be appreciated that the above disclosed embodiments of the invention are illustrative of structures for accomplishing inventive idea and that modifications of these structures will be apparent to those skilled in the idea to similarly accomplish this concept.

What I claim is:

1. In gearing, a gear having a thin web portion and gear teeth having a contact portion for engaging other gear teeth resulting in gear impulses causing anodic areas of vibration in a ring gear adjacent the contact portion, an annular conical spring having an outer portion continuously engaging in frictional contact the side face of said web portion in a ring substantially coinciding with said ring of anodic areas and having an inner portion, and means on said gear engaging said inner portion of said conical spring for universal pivotal movement in order to transfer primary vibration forces from any one point on the outer perimeter of said annular conical spring to a diametrically opposite point to induce a different secondary vibration to dissipate, distribute and cause interference vibration to substantially reduce or abort gear web vibration.

2. The invention defined in claim 1 and said fastening device providing a predetermined degree of preloading of said spring against said web to increase the resonant frequency above said gear impulse frequency.

3. The invention defined in claim 2 and said conical spring transferring said primary vibration diametrically to a larger area to induce reduced secondary vibrations so the vibrations meeting in the web and spring tend to substantially cancel each other.

4. The invention defined in claim 3 and said ring of anodic areas of vibration being close to and within the gear tooth root circle.

5. The invention defined in claim 4 and said preloading increasing said resonant frequency above the audible frequency range.

6. The invention defined in claim 1 and said gear teeth being wider than the meshing gear teeth and said conical spring engaging the side face of said gear teeth.

7. The invention defined in claim 5 and said gear teeth being wider than the meshing gear teeth and said conical spring engaging the side face of said gear teeth.

8. In gearing, a gear having a thin web portion and gear teeth subject to gear impulses causing anodic areas of vibration in a ring adjacent the gear teeth, an annular conical spring having an outer perimeter continuously engaging in frictional contact the side face of said web portion in a ring substantially coinciding with said ring of anodic areas, an inner perimeter and a central opening fastening means secured to said gear and extending through the central opening in said conical spring and having a head portion engaging the inner perimeter of said conical spring for universal pivotal movement in order to transfer vibration forces from any one point on the outer perimeter of said annular conical spring to an area diametrically opposite said any one point to dissipate, distribute and cause interference vibration to substantially reduce or abort gear web vibration.

9. The invention defined in claim 8 and said fastening device providing a predetermined degree of preloading of said spring against said web to increase the resonant frequency above said gear impulse frequency.

10. The invention defined in claim 7 and said conical spring transferring said primary vibration diametrically to a larger area to induce reduced secondary vibrations so the vibrations meeting in the web and spring tend to substantially cancel each other.

11. The invention defined in claim 8 and said ring of anodic areas of vibration being close to and within the gear tooth root circle.

12. The invention defined in claim 9 and said preloading increasing said resonant frequency above the audible frequency range.